No. 830,058. PATENTED SEPT. 4, 1906.
E. C. FITCH.
WINDING MECHANISM.
APPLICATION FILED OCT. 16, 1905.
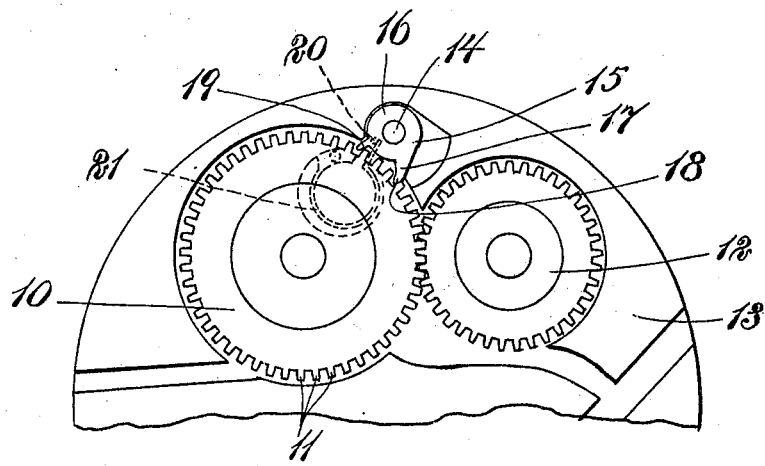
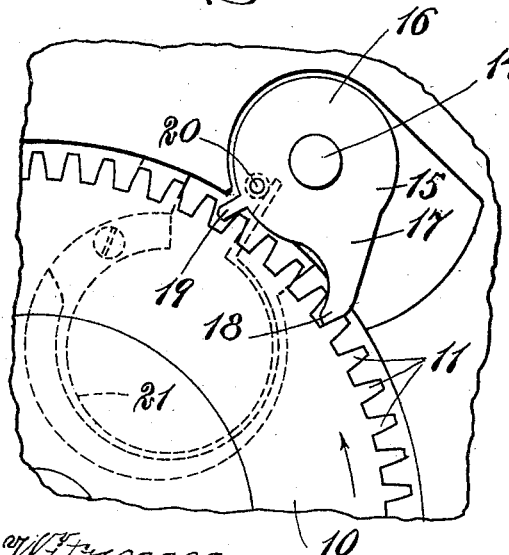 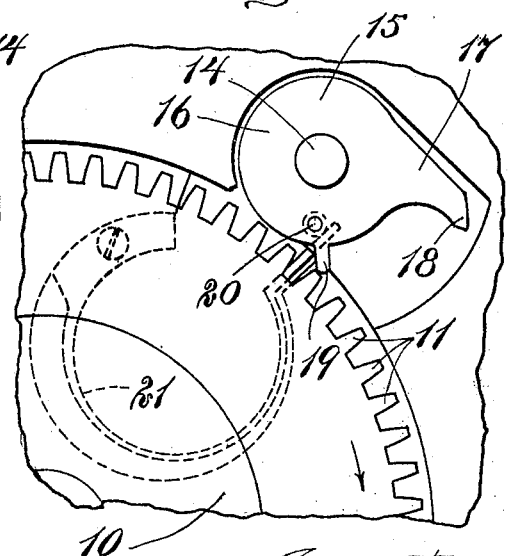

UNITED STATES PATENT OFFICE.

EZRA C. FITCH, OF WALTHAM, MASSACHUSETTS.

WINDING MECHANISM.

No. 830,058.　　　　Specification of Letters Patent.　　　　Patented Sept. 4, 1906.

Application filed October 16, 1905. Serial No. 282,932.

*To all whom it may concern:*

Be it known that I, EZRA C. FITCH, of Waltham, in the county of Middlesex and State of Massachusetts, have invented certain new and useful Improvements in Winding Mechanisms, of which the following is a specification.

My invention relates to winding mechanisms, and is more particularly adapted for use in connection with the mainsprings of watches. Its principal object is to provide an effective mechanism of this character which will obviate the possibility of leaving the mainspring too tightly wound, a condition which tends to subject the winding-drum arbor to undue torsional strain and to so force the convolutions of the mainspring into frictional engagement that its full force of expansion is not at once applied.

Of the accompanying drawings, in which similar characters designate like parts throughout the several views, Figure 1 shows in top plan view a portion of a watch-movement having one embodiment of my invention applied thereto. Fig. 2 is an enlarged detail, the parts being in the same relation as in Fig. 1 or retaining the mainspring against unwinding; and Fig. 3 is a similar view illustrating the position of the elements during the winding operation.

The numeral 10 designates the usual winding-wheel of a watch, it being provided with the teeth 11 and connected with the winding-stem through the pinion 12, both these members lying, as is customary, in a recess in the plate 13.

Pivoted upon a pin 14, adjacent to the winding-wheel, is a click 15, having a circular body portion 16, through the axis of which the pin projects, said click acting as a pawl, as hereinafter described. From one side of this portion 16 is an extension or arm 17, somewhat inclined toward the winding-wheel from a direction radial to the axis of the click or pawl. From the end of this extension 17 is a lateral engaging projection or tooth 18, so shaped that it is adapted to enter a space between any of the adjacent teeth 11. From the portion 16 radiates a secondary tooth 19, extending in a direction substantially parallel to the engaging projection and coöperating with the wheel-teeth. This tooth 19 is separated from the engaging projection or tooth 18 by a distance equal to the space between two of the teeth 11, so that the projection or tooth 18 may exactly enter the space between adjacent teeth of the wheel without the possibility of its being arrested upon a tooth-point. From the inner face of the click or pawl adjacent to the tooth 19 a pin 20 extends through an opening in the plate. At its inner extremity it is engaged by a suitable spring 21, mounted upon the plate and which tends to maintain the engaging projection in coaction with the teeth of the winding-wheel. The length of the arm 17 is considerably greater than that of the secondary tooth 19, so that said arm when in locking position, as hereinafter described, will be substantially tangential to the wheel 10. Normally the click or pawl will occupy the position illustrated in Fig. 2 of the drawings, it serving to hold the winding-wheel against backward rotation in the direction indicated by the arrow. When the stem is rotated, the teeth 11 move in the direction of the arrow in Fig. 3, and since they mesh with the tooth 19, swing the click upon its pivot until it assumes the position shown, at which time the engaging projection or tooth 18 is separated from the wheel-teeth by a space equal to that occupied by a plurality of these wheel-teeth. When the tension of the winding-wheel is relaxed, the contact of the teeth 11 and 19 moves the engaging projection or tooth 18 to its original position; but in doing this the distance which said projection has to travel is such that the winding-wheel is allowed to slacken back, insuring a slight loosening of the mainspring and relieving the drum-arbor of excessive torsion. It should be noted that the axis of the click or pawl occupies a position approaching a tangent to the winding-wheel through the point of engagement between the click projection and said winding-wheel. This causes the tension or back pressure of the spring to be transmitted to the pivot in a direction substantially tangential to the winding-wheel, and therefore in a manner least liable to strain the click or to disengage it. It will also be seen that my improved mechanism involves no wide departure from the click or pawl ordinarily employed, it being only necessary to provide it with the operating-tooth.

Having thus described my invention, I claim—

1. In a mainspring-winding mechanism, the combination with a toothed winding-wheel, of a click or pawl pivoted adjacent to the wheel and having an arm formed with a locking projection or tooth-shaped so that it may enter between the teeth of the wheel, and a secondary tooth for engagement with the wheel-teeth, said arm being of a length to resist back pressure of the wheel in a direction substantially tangential to the wheel.

2. In a mainspring-winding mechanism, the combination with a toothed winding-wheel, of a click or pawl pivoted adjacent to the wheel and having an arm formed with a locking projection or tooth shaped so that it may enter between the teeth of the wheel, and a secondary tooth for engagement with the wheel-teeth, the said arm being of a length to resist back pressure of the wheel in a direction substantially tangential to the wheel, said locking projection or tooth being movable by the secondary tooth a distance equal to the space occupied by a plurality of wheel-teeth.

3. In a mainspring-winding mechanism, the combination with a toothed winding-wheel, of a click or pawl pivoted adjacent to the wheel and comprising a circular portion through the axis of which the pivot extends, said circular portion having an arm formed with a tooth shaped to enter between the teeth of the wheel, said arm being of a length to resist back pressure of the wheel in a direction substantially tangential to the wheel, and a radial secondary tooth extending from the circular portion and coöperating with the wheel-teeth to cause the click or pawl to oscillate on its pivot.

In testimony whereof I have affixed my signature in presence of two witnesses.

EZRA C. FITCH.

Witnesses:
 E. A. MARSH,
 BEATRICE MOSHER.